United States Patent [19]

McRoy

[11] Patent Number: 5,126,730

[45] Date of Patent: Jun. 30, 1992

[54] MULTIPOINT TBOS INTERFACE INCLUDING BACKUP RESPONSE UNIT

[75] Inventor: Steven McRoy, Beverly, Mass.

[73] Assignee: AT&T Bell Laboratories, Murray Hill, N.J.

[21] Appl. No.: 502,479

[22] Filed: Mar. 30, 1990

[51] Int. Cl.⁵ .............................................. H04Q 9/00
[52] U.S. Cl. ........................ 340/825.16; 340/825.07; 371/8.2
[58] Field of Search ............. 340/825.16, 827, 825.07; 871/8.1, 8.2, 11.1, 11.2

[56] References Cited

U.S. PATENT DOCUMENTS

| | | | |
|---|---|---|---|
| 4,660,201 | 4/1987 | Nakamura | 340/825.16 |
| 4,775,976 | 10/1988 | Yokoyama | 371/8.2 |
| 4,984,240 | 1/1991 | Keren-Zvi et al. | 371/8.2 |

OTHER PUBLICATIONS

AT&T Compatibility Bulletin No. 149, "Maintenance Standards for Digital Transmission Systems", Issue 3, Sep. 1, 1986, pp. B2-1 through B3-6.
AT&T DDM-1000 User's Manual, "Dual DS3 Multiplexer For Both Loop and Trunk", AT&T 363-20-6-100, 1988, pp. 1-32.

Primary Examiner—Donald J. Yusko
Assistant Examiner—Edwin C. Holloway, III
Attorney, Agent, or Firm—Thomas Stafford

[57] ABSTRACT

Individual equipment units are adapted to be connected to a Telemetry Byte Oriented Serial (TBOS) protocol communication link in a bussed fashion. This allows more than one equipment unit to be monitored and controlled over a single TBOS communication link. Each equipment unit includes a multipoint receiver for receiving request messages from and a multipoint transmitter for transmitting response messages to the TBOS communication link. An additional multipoint receiver is adapted to receive response messages from other equipment units being monitored and controlled over the TBOS communication link. When a particular equipment unit is designated either a backup unit or an auxiliary backup unit, it is enabled to transmit response messages for the other equipment units being monitored and controlled if they do not respond in a prescribed interval. Consequently, a telemetry remote unit will receive appropriate response messages even though one or more equipment units being monitored and controlled have failed to respond. This insures that the TBOS communications link will not be taken out of service because equipment units have failed to respond, and that all equipment units that have not failed will continue to be monitored and controlled.

10 Claims, 2 Drawing Sheets

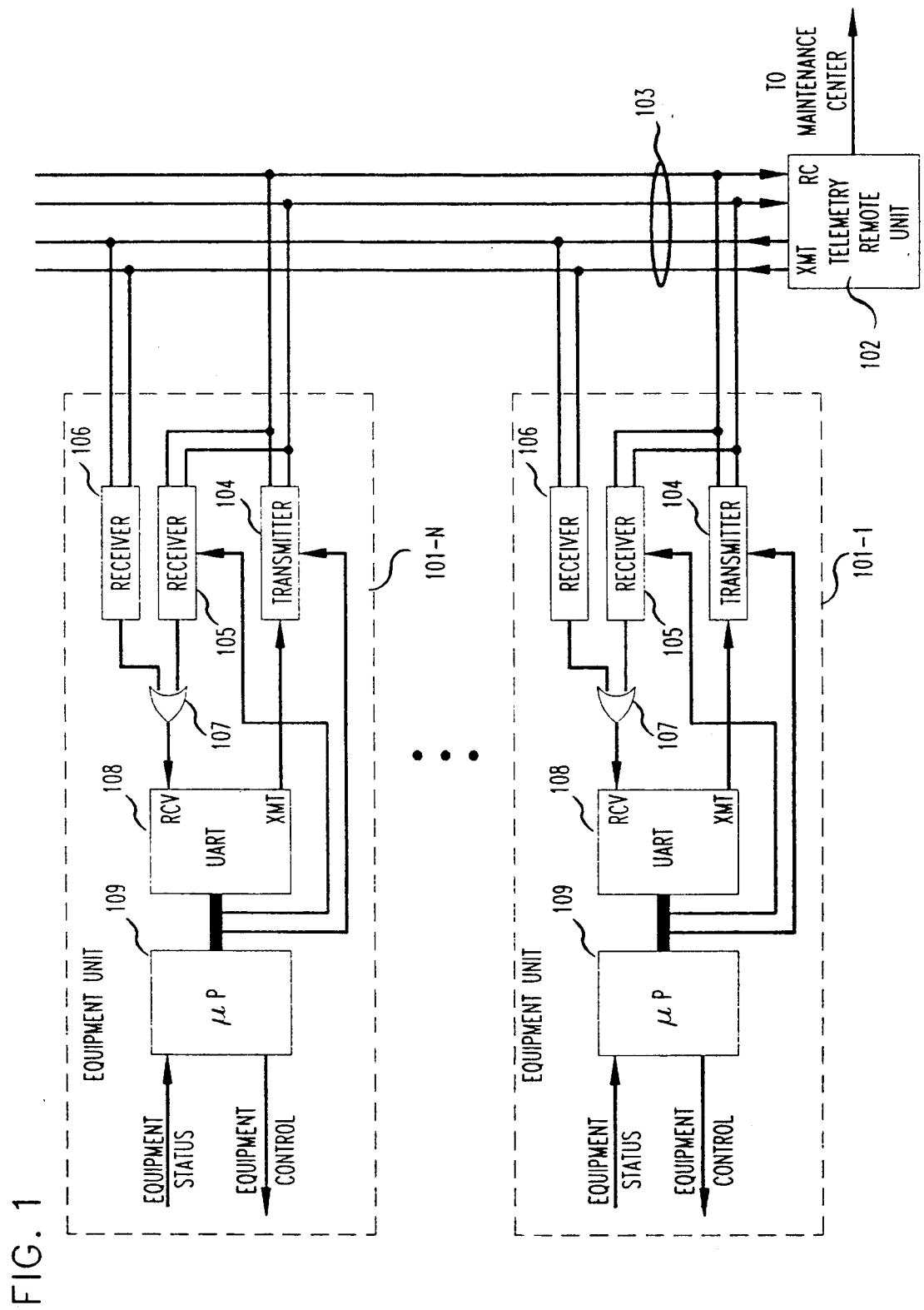

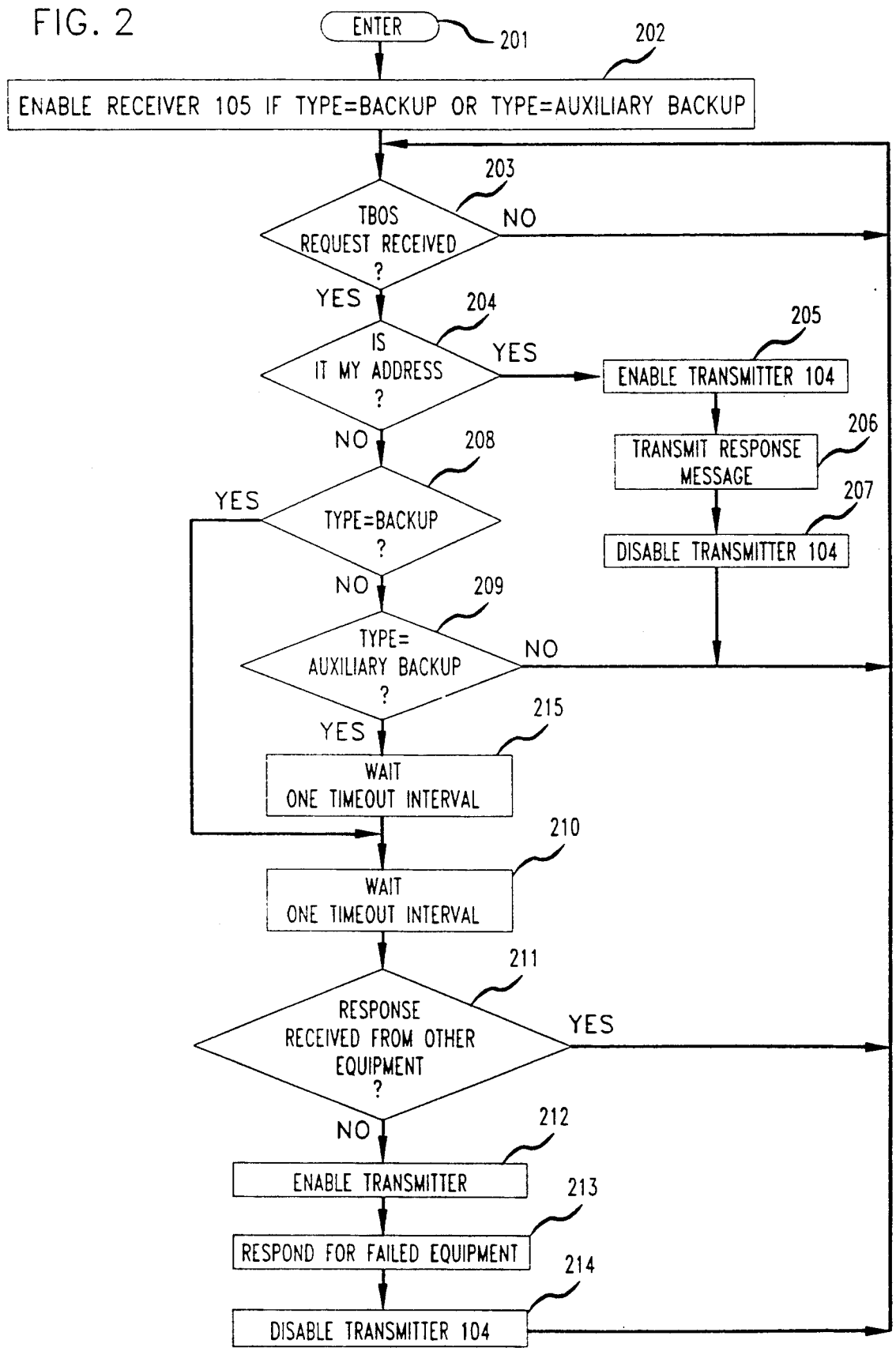

MULTIPOINT TBOS INTERFACE INCLUDING BACKUP RESPONSE UNIT

TECHNICAL FIELD

This invention relates to surveillance and control equipment and, more particularly, to equipment for interfacing to a Telemetry Byte Oriented Serial (TBOS) protocol communication link.

BACKGROUND OF THE INVENTION

Telemetry systems are known for receiving alarm surveillance data and for supplying control data to remote equipment. One such telemetry system which has been widely used employs the Telemetry Byte Oriented Serial (TBOS) protocol. TBOS is typically used to monitor and control remote equipment on a point-to-point basis. A telemetry remote unit is employed to consolidate up to eight TBOS communication links into one serial control communication link for communicating to a maintenance center. In prior arrangements, a separate TBOS communication link had been required to monitor and control each individual equipment unit. If eight units were to be monitored and controlled, all eight TBOS communication links were required. A feature of TBOS arrangements is that if an equipment unit does not respond to a predetermined number of request messages from a telemetry remote unit, the TBOS communication link is considered to have failed and will be taken out of service.

More recently, attempts have been made to monitor and control more than one equipment unit using only one TBOS communication link. One such arrangement includes an equipment bay having a plurality of shelves with an equipment unit on each shelf. A TBOS communication link from a telemetry remote unit is connected to an equipment unit on the bottom shelf in the equipment bay and the data being received and transmitted is communicated to and from, respectively, the other equipment units in the bay in a cascaded fashion. This prior arrangement operated satisfactorily when the equipment units on all the shelves of the bay remained equipped and operated properly. However, if there was a shelf power failure or a shelf controller was removed, the telemetry remote unit would stop receiving response messages from the equipment unit on that shelf. The equipment unit on the shelf immediately below it would respond for the failed equipment unit, but all equipment units on shelves above the shelf including the failed equipment unit would cease to be monitored and controlled. Such occurrences are not acceptable.

SUMMARY OF THE INVENTION

Problems of prior multipoint TBOS monitor and control arrangements are avoided, in accordance with the invention, by adapting the equipment units on shelves in a bay to be connected to the Telemetry Byte Oriented Serial (TBOS) protocol communication link in a so-called bussed fashion. This bussed connection is realized by adapting an equipment unit on each shelf to transmit and receive directly to and from the TBOS communication link, respectively, and by advantageously monitoring response messages of equipment units on each shelf on the TBOS communication link. An equipment unit on one of the shelves is designated as a so-called backup unit for the other equipment units on other shelves and will respond for another failed equipment unit if no response message is transmitted from that equipment unit during a predetermined timeout interval. Additionally, an equipment unit on another one of the shelves is designated an auxiliary backup unit and will respond for any other equipment unit which has failed if the backup unit fails to respond.

More specifically, each equipment unit to be monitored and controlled includes multipoint transmitter and receiver units which are adapted for interfacing directly to receive and transmit portions, respectively, of a TBOS communication link. The receiver unit receives TBOS request messages being transmitted on the TBOS communication link from a telemetry remote unit and a transmitter unit transmits response messages to the telemetry remote unit via the TBOS communication link. An additional receiver unit in the equipment unit is adapted to receive response messages from the other equipment units being transmitted on the TBOS communication link. This additional receiver unit is enabled when the particular equipment unit is designated as either a backup unit or an auxiliary backup unit. The backup unit or auxiliary backup unit will generate a substitute TBOS response message for equipment units which do not transmit response messages during prescribed timeout intervals. Depending on the particular system application, the number of equipment units designated and employed as backup units may vary.

A technical advantage of this invention is that the TBOS communication link will not be taken out of service because equipment units have failed to respond, and that all equipment units that have not failed continue to be monitored and controlled.

BRIEF DESCRIPTION OF THE DRAWING

In the Drawing:

FIG. 1 shows in simplified block diagram form a monitor and control system, including an embodiment of the invention; and FIG. 2 depicts a flow chart of the operation of the equipment units, including an embodiment of the invention.

DETAILED DESCRIPTION

FIG. 1 shows, in simplified block diagram form, details of a surveillance and control system, including an embodiment of the invention. Accordingly, shown are a plurality of equipment units 101-1 through 101-N which are mounted on shelves of an equipment bay (not shown) and telemetry remote unit 102. In this example, N is eight or less. Individual equipment units 101-1 through 101-N are interfaced to telemetry remote unit 102 via a Telemetry Byte Oriented Serial (TBOS) protocol communication link (hereinafter referred to as a bus) 103. Telemetry remote unit 102 is connected to a maintenance center via a telephone line. TBOS is intended to be and has been used for point-to-point monitoring and controlling of equipment and is described in AT&T Compatibility Bulletin No. 149, entitled "Maintenance Standards for Digital Transmission Systems", Issue 3, dated Sep. 1, 1986. Such telemetry remote units for interfacing to a TBOS bus are known in the art and are commercially available from American Telephone and Telegraph Company.

Each of equipment units 101-1 through 101-N to be monitored and controlled are equipped, in accordance with the invention, to directly interface to the TBOS bus 103. To this end, each of equipment units 101 includes transmitter unit 104, receiver units 105 and 106, OR gate 107, Universal Asynchronous Receiver Transmitter (UART) 108 and microprocessor 109. Transmitter unit 104 and receiver units 105 and 106 are multipoint transmit and receive units. In this example, the transmitter and receiver units include RS-485 units which are commercially available.

Transmitter unit 104, in each of equipment units 101, is connected to transmit response messages to the TBOS bus 103 and, in turn, to telemetry remote unit 102. Similarly, receiver unit 106, in each of equipment units 101, is connected to receive request messages, i.e., scan and command messages, on TBOS bus 103 which have been sent from telemetry remote unit 102. Each receiver unit 105, in equipment units 101, is advantageously connected to receive response messages being transmitted on TBOS bus 103 to telemetry remote unit 102. Received request messages are supplied from receiver units 105 and 106 via OR gate 107 to a receive (RCV) port of UART 108 and response messages to be transmitted are supplied via a transmit (XMT) port of UART 108 to transmitter unit 104. Such UART units are well known in the art and commercially available from a number of sources.

Microprocessor 109 is employed to monitor status indications from an associated equipment unit, to control operation of the equipment unit and to control operation of this embodiment of the invention. Any one of a number of known microprocessors may be employed for this purpose. To this end, microprocessor 109 receives request and response messages from UART 108 and supplies appropriate response messages to UART 108. Additionally, microprocessor 109 controllably enables and disables transmitter unit 104 and receiver unit 105. Receiver unit 105 is enabled only when the associated equipment unit has been designated either a back-up unit or an auxiliary back-up unit. This allows microprocessor 109 in the backup unit and/or auxiliary back-up unit to monitor addresses in response messages being sent to telemetry remote unit 102 on TBOS bus 103. Transmitter unit 104 is enabled only when transmitting a response message. This is to prevent multiple transmitter units being simultaneously enabled on TBOS bus 103. It should be noted that the designation of any of equipment units 101 as either a backup unit or an auxiliary backup unit is effected upon installation of the equipment units in the equipment bay. It is noted that the request messages sent by telemetry remote unit 102 have a field including an address of the particular one of equipment units 101 being polled.

FIG. 2 depicts in flow chart form, steps in the operation of this embodiment of the invention under control of microprocessor 109 in receiving request messages from TBOS bus 103, transmitting response messages to TBOS bus 103 and if designated a backup equipment unit or an auxiliary backup equipment unit, monitoring the response messages being transmitted by other ones of equipment units 101 on TBOS bus 103. Accordingly, the process is entered via step 201. Thereafter, step 202 causes receiver unit 105 to be enabled if the particular equipment unit has been designated either a backup unit or an auxiliary backup unit. Then, step 203 tests to determine if a TBOS request message has been received. If the test result in step 203 is NO, step 203 is repeated. If the test result in step 203 is YES, a request message has been received and step 204 determines if the address in the request message is for this particular equipment unit. If the test result in step 204 is YES, the address identifies this particular equipment unit and step 205 causes transmitter unit 104 in the equipment unit to be enabled. Step 206 causes the appropriate response message to be supplied to TBOS bus 103 and, in turn, to remote telemetry unit 102. Thereafter, step 207 causes transmitter unit 104 to be disabled. As indicated above, disabling of transmitter unit 104 is important so that there is no interference with response messages from other equipment units that are being supplied to TBOS bus 103. Thereafter, control is returned to step 203 and steps 203 through 207 are iterated until step 204 yields a NO result. Then, step 208 tests to determine if this particular equipment unit is a backup unit or not. If the test result in step 208 is NO the equipment unit is not a backup unit and step 209 tests to determine if the particular equipment unit has been designated an auxiliary backup unit or not. If the test result in step 209 is NO the equipment is not an auxiliary backup unit and control is returned to step 203. If step 208 yields a YES result, the particular equipment unit has been designated a backup unit and, since the request message is not addressed to the backup unit, step 210 causes this equipment unit to wait a predetermined timeout interval. Then, step 211 tests to determine if a response message has been received via receiver unit 105 from another equipment unit. If the test result in step 211 is YES, the addressed equipment unit has responded and control is returned to step 203. If step 211 yields a NO result, which indicates that the other equipment unit has not responded and consequently has failed in some manner, step 212 causes transmitter unit 104 to be enabled in this particular equipment unit. Then step 213 causes this equipment unit to transmit a response message for the failed equipment unit. Step 214 disables transmitter unit 104 for the reasons indicated above and control is again returned to step 203. Returning to step 209, if the particular equipment unit has been designated an auxiliary backup unit, a YES result is obtained and step 215 causes this auxiliary backup unit to wait a predetermined timeout interval. The wait interval in step 215 will be in addition to the wait interval of step 210 and is necessary in order to determine if the designated backup unit has transmitted a response message for a failed equipment unit or whether the backup unit may have failed. Thereafter, appropriate ones of steps 210 through 214 are repeated as described above.

Timeout intervals may be chosen appropriately depending on the expected response time of equipment units 101 so long as telemetry remote unit 102 receives a response from one of equipment units 101 within 200 msec. In one example, each timeout interval is 50 msec.

I claim:
1. Apparatus for interfacing to a telemetry byte oriented serial (TBOS) protocol communication link including a transmit portion and a receive portion comprising:
   means adapted to be connected to the transmit portion of the TBOS communication link for receiving TBOS request messages;
   means adapted to be connected to the receive portion of the TBOS communication link for transmitting TBOS response messages;
   means adapted to be connected to the receive portion of the TBOS communication link for monitoring TBOS response messages being transmitted thereon, said means for monitoring including means for detecting whether a TBOS response message has been transmitted from another equip- ment unit addressed in a received request message within a prescribed interval; and means responsive to received request messages and monitored response messages for generating a substitute TBOS response message when an appropriate TBOS response message has not been transmitted on said receive portion of the TBOS communication link by said another equipment unit addressed in said received request message, said means for generating generates said substitute TBOS response message for said another equipment unit addressed in said received request message when a TBOS response message has not been detected as being transmitted on said TBOS receive portion during said prescribed interval, said substitute TBOS response message being supplied to said means for transmitting to be transmitted on the receive portion of the TBOS communication link.

2. The apparatus as defined in claim 1 wherein said means for monitoring includes means for indicating whether said apparatus has been designated either a backup unit or an auxiliary backup unit, controllable means for receiving said TBOS response messages and means for enabling said controllable means to receive said TBOS response messages when said apparatus is designated either a backup unit or an auxiliary backup unit and for disabling said controllable means otherwise.

3. The apparatus as defined in claim 2 wherein said means for transmitting includes means for controllably enabling and disabling said transmitting of response messages.

4. The apparatus as defined in claim 2 wherein said prescribed interval comprises a timeout interval having a predetermined duration.

5. Apparatus including a telemetry remote unit and at least one telemetry byte oriented serial (TBOS) protocol communication link including a transmit portion and a receive portion, the telemetry remote unit being adapted to transmit TBOS request messages on the transmit portion and to receive TBOS response messages on the receive portion of the TBOS communication link for monitoring the status of a plurality of equipment units, each of the equipment units comprising:

means adapted to be directly connected to the transmit portion of the TBOS communication link for receiving TBOS request messages;

means adapted to be directly connected to the receive portion of the TBOS communication link for transmitting TBOS response messages;

means adapted to be directly connected to the receive portion of the TBOS communication link for monitoring TBOS response messages being transmitted thereon, said means for monitoring including means for detecting whether a TBOS response message has been transmitted from another equipment unit addressed in a received request message within a prescribed interval; and means responsive to received request messages and monitored response messages for generating a substitute TBOS response message when an appropriate TBOS response message has not been transmitted on said receive portion of the TBOS communication link by said another equipment unit addressed in said received request message, said means for generating generates said substitute TBOS response message for said another equipment unit addressed in said received request message when a TBOS response message has not been detected as being transmitted on said TBOS receive portion during said prescribed interval, said substitute TBOS response message being supplied to said means for transmitting to be transmitted on the receive portion of the TBOS communication link.

6. The apparatus as defined in claim 5 wherein said means for monitoring includes means for indicating that said apparatus has been designated either a backup unit or an auxiliary backup unit, controllable means for receiving said TBOS response messages and means for enabling said controllable means to receive said response messages when said apparatus is designated either a backup unit or an auxiliary backup unit and for disabling said controllable means otherwise.

7. The apparatus as defined in claim 6 wherein said means for transmitting includes means for controllably enabling and disabling said transmitting of response messages.

8. The apparatus as defined in claim 6 wherein said prescribed interval comprises a timeout interval having a predetermined duration.

9. In apparatus for interfacing to a telemetry byte oriented serial (TBOS) protocol communication link including a transmit portion and a receive portion, a method comprising the steps:

receiving TBOS request messages directly from the receive portion of the TBOS communication link;

transmitting TBOS response messages directly to the receive portion of the TBOS communication link;

monitoring TBOS response messages being transmitted on the receive portion of the TBOS communication link, the step of monitoring further including the step of detecting whether a TBOS response message has been transmitted from another equipment unit addressed in a received request message within a prescribed interval; and generating and transmitting a substitute TBOS response message when an appropriate response message has not been transmitted on said receive portion of the TBOS communication link by said another equipment unit addressed in said received request message, said step of generating including generating a substitute TBOS response message for said another equipment unit addressed in said received request message when a TBOS response message has not been detected as being transmitted on said TBOS receive portion during said prescribed interval.

10. The method as defined in claim 9 wherein said prescribed interval comprises a timeout interval having a predetermined duration.

* * * * *